A. FROMMER & C. W. ZENKER.
MUSIC CABINET.
APPLICATION FILED JULY 17, 1914.

1,159,003.

Patented Nov. 2, 1915.
2 SHEETS—SHEET 1.

Inventors
Albert Frommer
Charles W. Zenker
By Victor J. Evans,
Attorney.

A. FROMMER & C. W. ZENKER.
MUSIC CABINET.
APPLICATION FILED JULY 17, 1914.
1,159,003.
Patented Nov. 2, 1915.
2 SHEETS—SHEET 2.
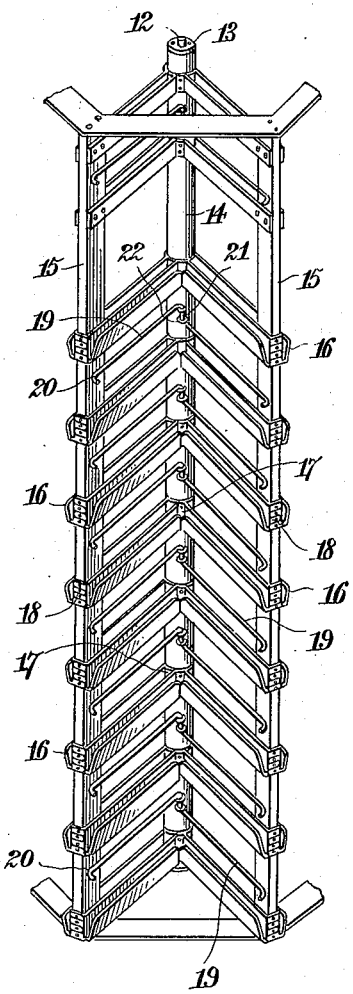
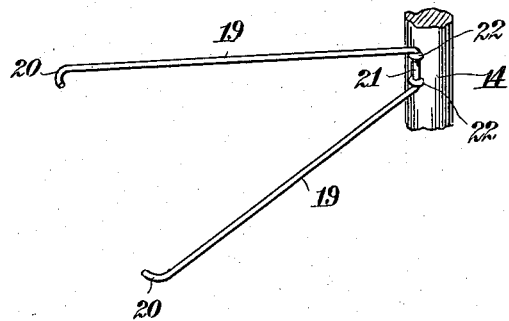
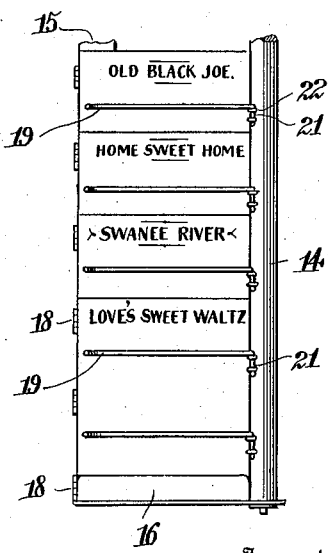
Inventors
Albert Frommer
Charles W. Zenker.
By Victor J. Evans,
Attorney.

UNITED STATES PATENT OFFICE.

ALBERT FROMMER AND CHARLES W. ZENKER, OF ST. PAUL, MINNESOTA.

MUSIC-CABINET.

1,159,003.    Specification of Letters Patent.    Patented Nov. 2, 1915.

Application filed July 17, 1914. Serial No. 851,565.

*To all whom it may concern:*

Be it known that we, ALBERT FROMMER and CHARLES W. ZENKER, citizens of the United States, residing at St. Paul, in the county of Ramsey and State of Minnesota, have invented new and useful Improvements in Music-Cabinets, of which the following is a specification.

The invention relates to cabinets, and more particularly to the class of revolving music rack cabinets.

The primary object of the invention is the provision of a cabinet wherein the rack therein is revoluble and carries holders for sheet music so that the same can be individually held in a convenient manner to enable the quick collection of any particular sheets of music by the user of the cabinet, each sheet being visible through a doorway in the casing of the cabinet on revolving the rack therein.

Another object of the invention is the provision of a cabinet wherein the contents will be held assorted, thus avoiding the necessity of handling the bulk of sheet music to locate a particular sheet of music desired to be played, the rack being of novel form, as well as the holders and clips to retain the music in place.

A further object of the invention is the provision of a cabinet which is simple in construction, neat and attractive in appearance, reliable and efficient in its purpose, and inexpensive in manufacture.

Other objects will be in part obvious and in part hereinafter pointed out.

The invention accordingly consists in the construction, combination of elements and arrangement of parts as will be exemplified in the construction hereinafter set forth, and the scope of the application of which will be indicated in the following claim.

Figure 1:
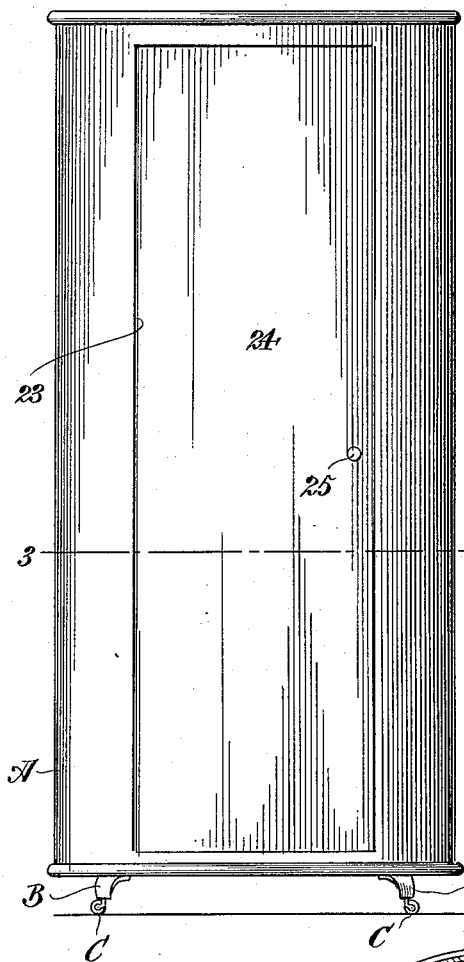
Figure 2:
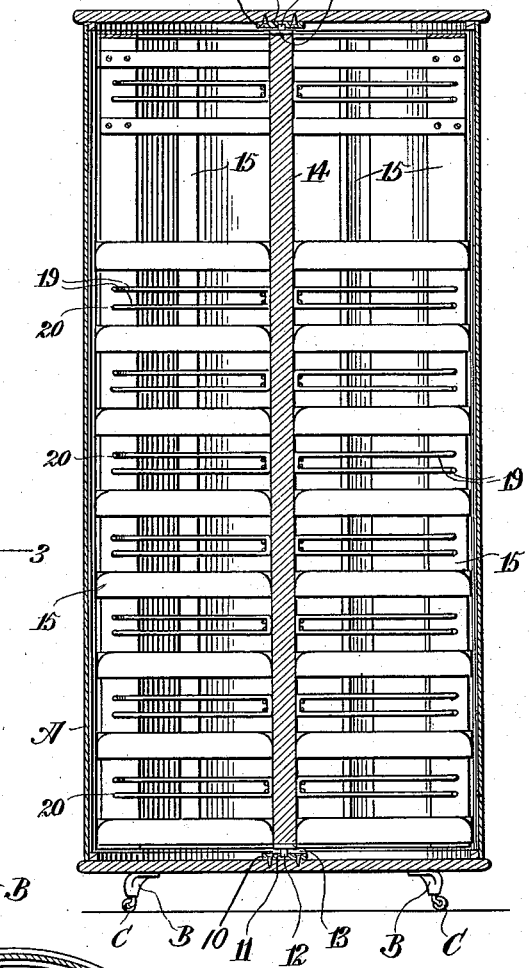
Figure 3:
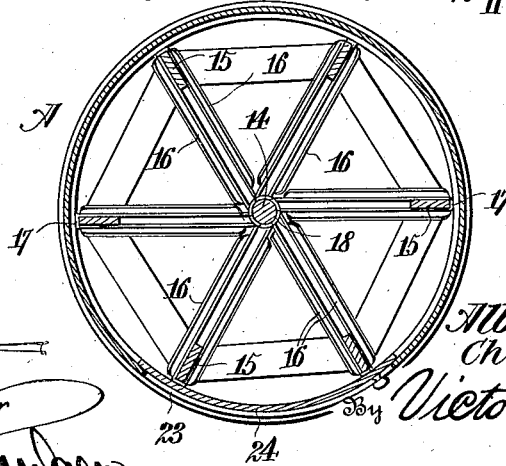

In the drawings:—Figure 1 is a front elevation of a cabinet constructed in accordance with the invention. Fig. 2 is a vertical longitudinal sectional view thereof. Fig. 3 is a horizontal sectional view on the line 3—3 of Fig. 1. Fig. 4 is a fragmentary perspective view of one of the wings of the rack. Fig. 5 is a fragmentary perspective view showing in detail the mounting of the clips. Fig. 6 is a fragmentary front elevation of one of the wings of the revoluble rack showing the music held therein.

Similar reference characters indicate corresponding parts throughout the several views in the drawings.

Referring to the drawings in detail, the cabinet comprises a cylindrical casing A, from the bottom of which depend legs B having mounted therein roller casters C of the ordinary well-known construction, so that the cabinet can be conveniently moved from place to place as may be required. Suitably fastened centrally of and on the inner face of the top and bottom of the casing A are circular bearing plates 10 formed with central sockets 11 in which are rotatably engaged the pivot lugs 12 formed on and projecting from circular bearing plates 13 which are fixed to opposite ends of the central column or rod 14 of the revoluble music rack hereinafter fully described.

The music rack comprises a plurality of outer posts or strips 15 which are arranged concentrically about the rod 14 in spaced relation to each other and are vertically disposed to extend parallel with the said rod, and to these posts and rod are fixed music sheet holders, each comprising a trough 16 formed from a single sheet of tin, although it may be made of any other metal, bent into the form of a trough to provide a pocket for receiving the sheet music. On the rear wall of the trough 16 at one end thereof is formed a right angular ear 17 through which are passed suitable fasteners for securing it to the rod 14, while at the opposite end of this wall are formed spaced right angular ears 18 through which are passed suitable fasteners for connecting the same to the outer post or strip 15, and in this manner the troughs 16 will extend radially from the rod 14 in spaced vertical series, the troughs with the posts or strips 15 being the wings of the music rack. Any number of troughs 16 can be employed, and arranged in radial rows vertically of the cabinet.

Mounted upon the rod 14 between superposed troughs 16 are resilient clips, each comprising a single strand of wire bent to form spring arms 19 having curled outer ends 20, and these arms serve to hold the sheet music in upright position when placed in the holder, the medial portion 21 between the arms being fastened to the rod 14 through the medium of staples 22, or other fasteners. The curled ends 20 of the arms 19 permit the spreading of the said arms to remove the music from the outer open end of the troughs 16 when any particular sheet of music is to be played by the user of the cabinet.

Formed in the front of the case A is a vertical doorway 23 which is normally closed by means of a door 24, either of the sliding or swinging type, the latter being provided with the usual hand knob 25 on its front face, and on the opening of the door 24 access may be had to the music rack so that on revolving the same any particular sheet of music can be removed from the holder thereof in the rack.

It is of course to be understood that the music holders 19 can be placed on one or both sides of each wing of the revoluble music rack so that the music will be held at both sides of the wing or at one side thereof, thereby increasing or decreasing the capacity of the cabinet.

From the foregoing it is thought that the construction and manner of use of the device will be clearly understood, and therefore a more extended explanation has been omitted.

What is claimed is:—

A music cabinet having a central column revolubly mounted therein, outer posts concentric to the column and parallel therewith and arranged to revolve with the column, spaced horizontally arranged music sheet holders connecting the post to the column, substantially V-shaped resilient members fixed at their bights to the column to position the arms of each against opposite outer posts for holding sheets of music edgewise in the holders.

In testimony whereof we affix our signatures in presence of two witnesses.

ALBERT FROMMER.
CHARLES W. ZENKER.

Witnesses:
 CLARA GRONEWOLD,
 T. J. GRONEWOLD.

Copies of this patent may be obtained for five cents each, by addressing the "Commissioner of Patents, Washington, D. C."